United States Patent [19]

Ando

[11] Patent Number: 5,365,323
[45] Date of Patent: Nov. 15, 1994

[54] IMAGE RECORDING DEVICE

[75] Inventor: Kyoichi Ando, Kawasaki, Japan

[73] Assignee: Canon Kabushiki Kaisha, Tokyo, Japan

[21] Appl. No.: 220,937

[22] Filed: Mar. 31, 1994

Related U.S. Application Data

[63] Continuation of Ser. No. 943,485, Sep. 11, 1992, abandoned.

[30] Foreign Application Priority Data

Sep. 19, 1991 [JP] Japan .................. 3-266881
Oct. 23, 1991 [JP] Japan .................. 3-302671

[51] Int. Cl.⁵ .................................. G03G 21/00
[52] U.S. Cl. .......................... 355/321; 271/270
[58] Field of Search ............... 271/3, 3.1, 4, 6, 7, 271/8.1, 10, 34, 114, 147, 148, 152, 153, 264–267, 270; 355/208, 228, 232, 233, 308, 309, 311, 316, 318, 319, 320, 321, 329

[56] References Cited

U.S. PATENT DOCUMENTS

| | | | |
|---|---|---|---|
| 3,724,942 | 4/1973 | Gibson et al. | 355/71 X |
| 4,563,082 | 1/1986 | Sato | 355/55 X |
| 4,634,262 | 1/1987 | Imaizumi et al. | 355/311 |
| 4,634,263 | 1/1987 | Miwa | 271/270 X |
| 4,659,208 | 4/1987 | Miyazaki et al. | 355/8 |
| 4,768,068 | 8/1988 | Partilla | 355/75 |
| 4,972,208 | 11/1990 | Young et al. | 346/108 |
| 5,084,741 | 1/1992 | Takemura et al. | 355/316 |
| 5,119,145 | 6/1992 | Honjo et al. | 355/308 |
| 5,132,741 | 7/1992 | Kitajima et al. | 355/309 |

Primary Examiner—Leo P. Picard
Assistant Examiner—Christopher Horgan
Attorney, Agent, or Firm—Fitzpatrick, Cella, Harper & Scinto

[57] ABSTRACT

Disclosed is an image recording device having a conveying section for conveying sheet-like subjects, an illuminating section for illuminating the subjects with the light and a recording section for recording image information given from the illuminating section. A driving source for a paper feed section positioned upstream with respect to the illuminating section and an intra-device conveying section exclusive of the paper feed section is divided. A conveying speed of the paper feed section is made variable through a display section for displaying the conveying speed thereof and a setting switch capable of manually arbitrarily setting the conveying speed.

11 Claims, 11 Drawing Sheets

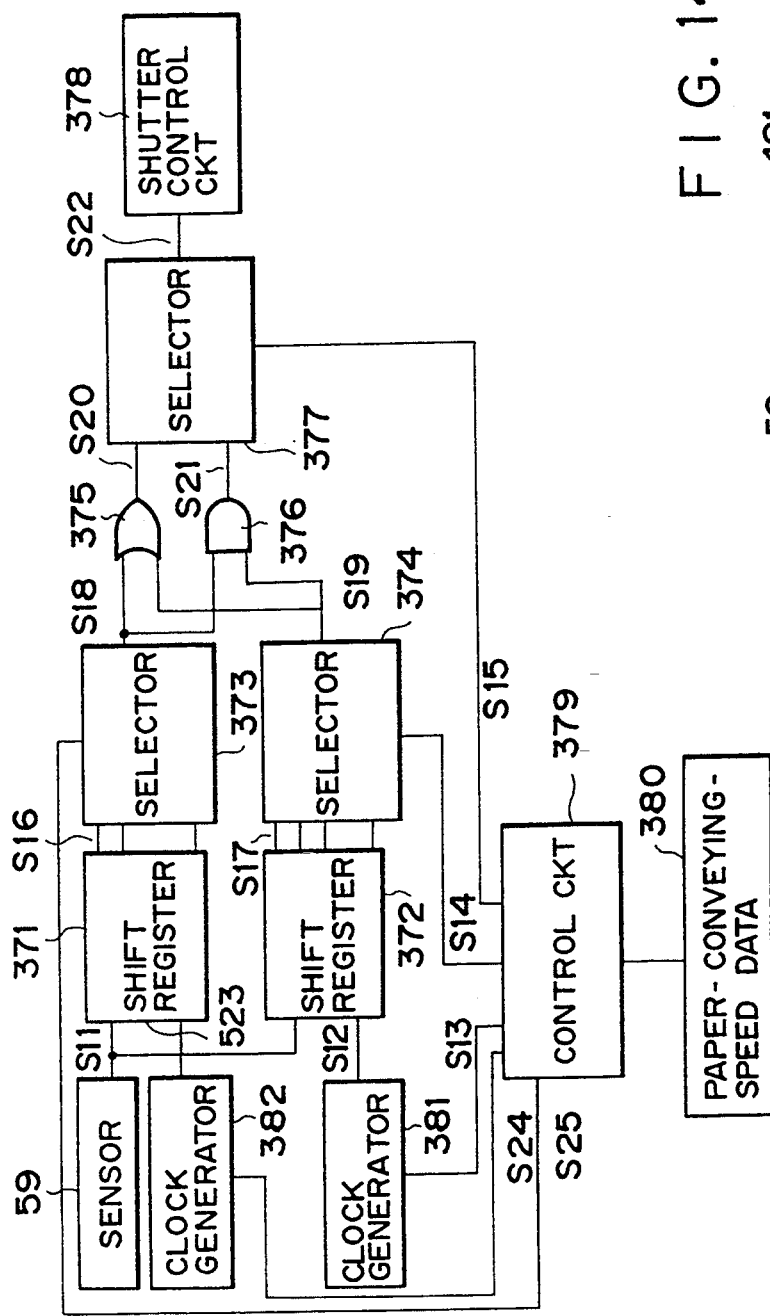
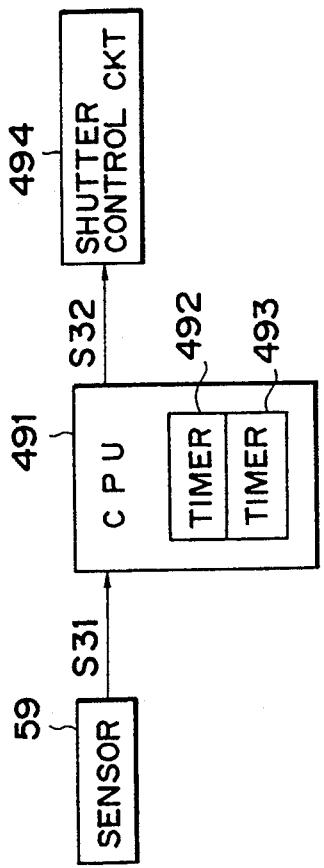

IMAGE RECORDING DEVICE

This application is a continuation of application Ser. No. 07/943,485, filed Sep. 11, 1992, now abandoned.

BACKGROUND OF THE INVENTION

1. Field of the Invention

The present invention relates to an image recording device for recording image information of the original such as, e.g., a check, an ordinary document, etc. on a recording medium such as a microfilm or the like.

2. Related Background Art

This type of prior art image recording device will be exemplified by FIG. 16. FIG. 16 is a side elevation illustrating one mode of a subject conveying system of a photographing device 1 serving as an image recording device.

When subjects S are placed on a paper feed tray 2 inclined downwards, the subjects S are moved in an arrowed direction by dint of the gravitational force. These subjects S are fed while being singly separated by a paper feed roller 3 rotating clockwise in the FIGURE and a separation roller 4 rotating clockwise in the FIGURE. Next, a lower belt 7 wound on belt rollers 6, 11 and on tension roller 10 is driven with rotations of a lower driving roller 9. The subjects S are conveyed from the horizontal direction to the vertical direction, while an idle roller 5 and a guide unit 8 depress the subjects S on the lower belt 7. The subjects S pass between a pair of guide glasses 22 serving as an exposure section.

Then, both surfaces of the subject S are simultaneously illuminated with beams of a pair of illumination lamps 21 during a passage between the guide glasses 22. Nip rollers 12, 13 are provided above and under the guide glasses 22. Further, an upper belt 18 wound on belt rollers 15, 17 and on a tension roller 16 is driven with rotation of an upper driving roller 19. A conveying route of the subjects S passing through the guide glasses 22 is changed from the vertical direction to the horizontal direction, while an idler roller 14 pushes the subjects S on the upper belt 18. The subjects S advance in an arrowed direction and are ejected into a stacker 20.

By the way, the following is a reason why the conveying speed of the subject S is constant in the conventional example explained above. If the conveying speed is made variable, an exposure time during photographing is also varied, and it is therefore required that a light quantity be adjusted. Besides, there differ the position of the stacker 20 and the way how the subject S springs out during the ejection in accordance with the speeds. A troublesome problem arises, wherein the positional adjustment is needed. However, the checks, etc. are quickly mass-processed, and hence the conveying speed is preferably high. While on the other hand, there exists a possibility that a relatively thin ordinary sheet-like document, etc. may be damaged by an impingement when feeding the document between the paper feed roller and the separation roller that are rotating at a high velocity. Therefore, the paper is fed preferably at a low speed during photographing thereof. As described above, there is such a defect that the paper feed speed can not be changed to a speed optimal to each subject.

SUMMARY OF THE INVENTION

It is a general object of the present invention, which obviates the defects inherent in the prior art described above, to provide an image recording device capable of effecting records suited to different types of subjects and eliminating the necessity for adjustments of respective sections even when adjusting a conveying speed of the subject.

To accomplish the foregoing object, according to one aspect of the present invention, there is provided an image recording device comprising: a conveying section for conveying sheet-like subjects; an illuminating section for illuminating the subjects with the light; and a recording section for recording image information given from the illuminating section, characterized by dividing a driving source for a paper feed section positioned upstream with respect to the illuminating section and an intra-device conveying section exclusive of the paper feed section and making variable a conveying speed of the paper feed section.

Further, the conveying speed of the paper feed section is made variable by providing a display section for displaying the conveying speed of the paper feed section and a setting switch capable of manually arbitrarily setting the conveying speed.

The thus constructed image recording device is capable of conveying the subjects at the paper feed speeds optimal to the respective subjects by adjusting the conveying speed of the paper feed section without adjusting the light quantity during the illumination and the position of the stacker in the ejecting section.

Furthermore, the conveying speed is recognizable by providing the display section and the setting switch. A degree of freedom to set the conveying speed increases, whereby a paper feeding state optimal to the subject can be developed.

BRIEF DESCRIPTION OF THE DRAWINGS

Other objects and advantages of the present invention will become apparent during the following discussion taken in conjunction with the accompanying drawings, in which:

FIG. 13 is a block diagram showing the second embodiment of the shutter opening/closing control circuit;

FIG. 14 is a block diagram showing the third embodiment;

DETAILED DESCRIPTION OF THE PREFERRED EMBODIMENTS

The first embodiment of the present invention will hereinafter be described with reference to FIGS. 1 through 3.

Figure 1:
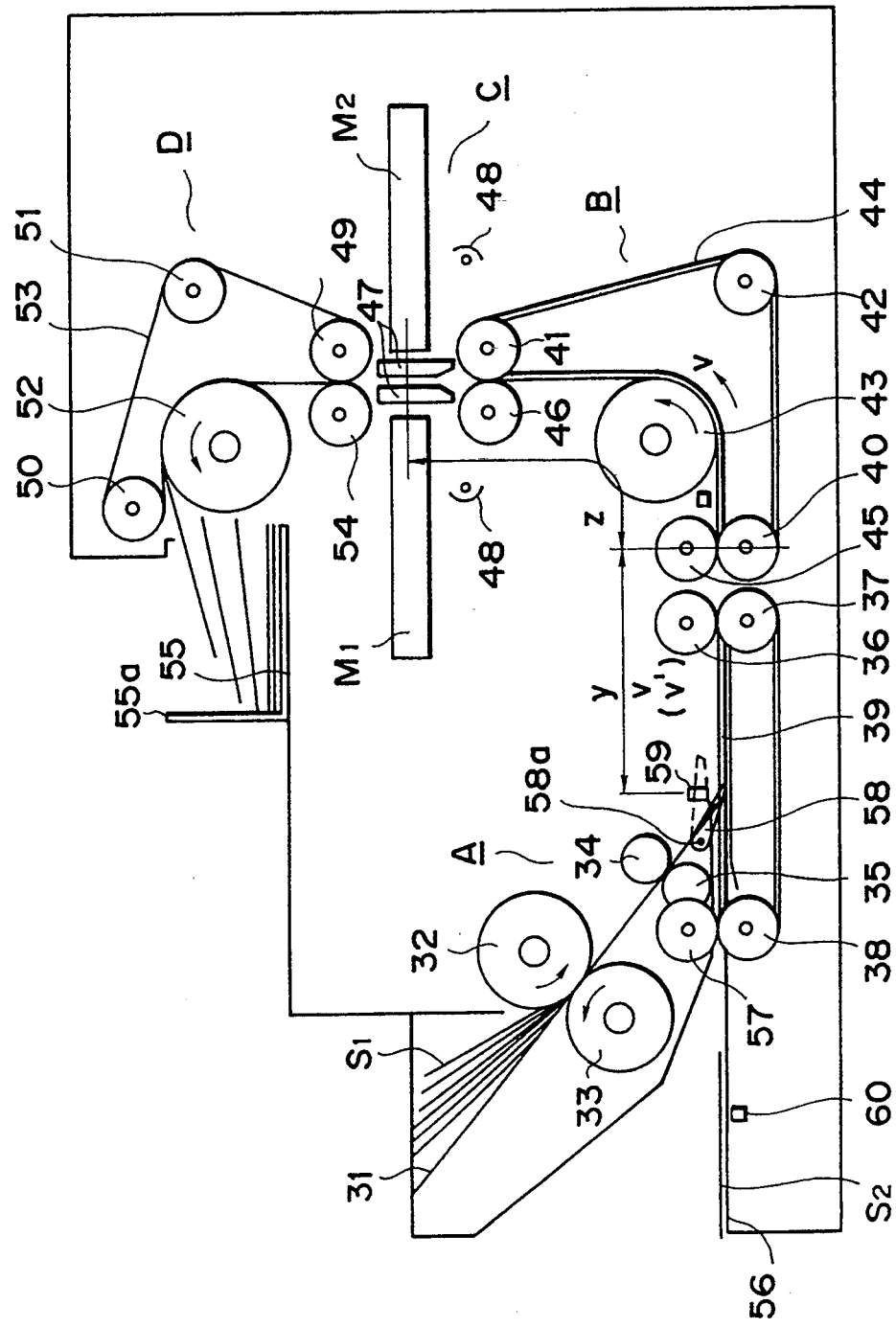
FIG. 1 is a schematic block diagram illustrating a subject conveying system of an image recording device in the first embodiment of the present invention.

FIG. 1 is a view illustrating a whole construction of a subject conveying system of a photographing device defined as an image recording device. Referring to the same FIGURE, a relatively thick subject (original) $S_1$ of, e.g. a check, etc. is, when placed on a paper feed board 31 inclined downwardly of a device body 30, moved in an arrowed direction by dint of the gravitational force. The subjects $S_1$ are singly separated by a paper feed roller 32 rotating anticlockwise in the FIGURE and a separation roller 33 rotating anticlockwise in the FIGURE, which constitute a paper feed section A. The subjects are thereafter conveyed onto a conveying belt 39 wound on belt driving rollers 37, 38 by means of paired conveying rollers 34, 35. The subjects $S_1$ are fed to a photographing upstream-side conveying section B by a driven roller 36 paired with the driving roller 37 through the conveying belt 39. This photographing upstream-side conveying section B is constructed of: belt rollers 40, 41; a tension roller 42; a conveying belt 44 wound on a lower large-diameter roller 43; and driven rollers 45, 46 paired respectively with the belt rollers 40, 41. The subjects $S_1$ fed from the paper feed section A are thereby conveyed to a photographing illumination section C.

The photographing illumination section C consists of a pair of transparent parallel glasses 47 and a pair of illumination lamps 48 disposed in front and in rear of the glasses. The upper and under surfaces of the conveyed subject $S_1$ are illuminated with beams of the illumination lamps 48 when passing between the pair of parallel glasses 47. Images on the upper and under surfaces of the subject $S_1$ are exposed onto films through unillustrated optical systems as well as through mirrors $M_1$, $M_2$.

The subjects $S_1$ are ejected outside the device body 30 by means of a photographing downstream-side conveying section D constructed of: belt rollers 49, 50; a conveying belt 53 wound on a tension roller 51 and an upper large-diameter roller 52; and a driven roller 54 paired with the belt roller 49. The ejected subjects $S_1$ impinge on a standing plate 55a of a stacker 55 and are thereby sequentially stacked in alignment on the stacker 55.

Next, in the case of photographing a relatively thin sheet-like subject (original) $S_2$ such as an ordinary document, etc., the subject $S_2$ is inserted along a horizontal manual feed board 56 disposed downwardly of the paper feed board 31 and slid on this board. The subject $S_2$ is, when fed in between the conveying belt 39 and a driven roller 57 paired with a driving roller 58, conveyed onto the conveying belt 39, while a conveying path changeover pawl 58 is rotated about a shaft 58a and is pushed up. The subject $S_2$ is thereafter imaged in the same way with the subject $S_1$ described above and then ejected.

Note that a subject detection sensor 59 is disposed downstream with respect to the conveying path changeover pawl 58. This sensor 59 controls opening/closing timings of a shutter (unillustrated) of a photographing section. A manual feed detection sensor 60 detects the fact that the subject is manually fed. Further, the conveying path changeover pawl 58 normally, as indicated by a solid line of FIG. 1, forms a conveying path of an automatic paper feed section. When the subject $S_2$ is fed from the manual feed board 56, however, the conveying path changeover pawl 58 forms a conveying path of a manual feed section, wherein the pawl rotates about the shaft 58a and is easily pushed up.

Figure 2:
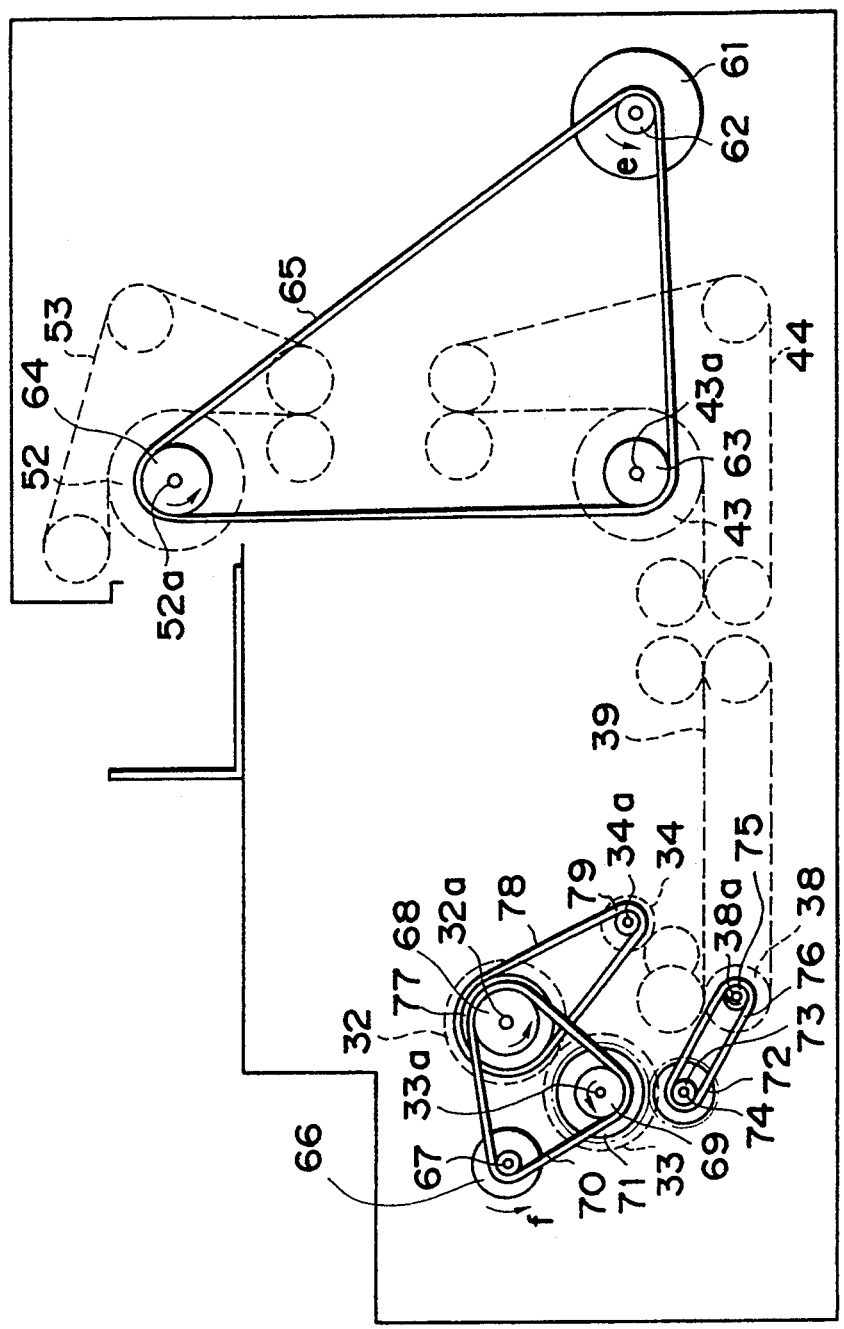
FIG. 2 is a schematic block diagram depicting a driving system thereof.
Figure 3:
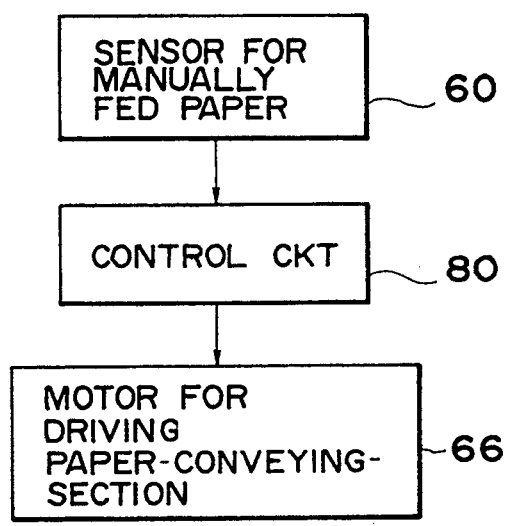
FIG. 3 is a block diagram showing how the operation thereof is controlled.

Next, FIG. 2 depicts a driving system of the above-mentioned subject conveying system.

Referring to the same FIGURE, a main motor 61 constituting a second conveying means rotates in an arrowed direction e (counterclockwise in the FIGURE). The power thereof is transferred from a coaxial motor pulley 62 via a belt 65 to a pulley 63 fixed to a shaft 43a of a lower large-diameter roller 43 and to a pulley fixed to a shaft 52a of an upper large-diameter roller 52. The above-mentioned conveying belts 44, 53 are thereby operated. The subject is conveyed to the photographing section through the conveying belt 44. The subject which has already undergone an imaging process is ejected from the device body through the conveying belt 53.

Further, a driving motor 66 constituting a first conveying means rotates in an arrowed direction f (counterclockwise in the FIGURE). The power thereof is transferred from a coaxial motor pulley 67 via a belt 70 to a pulley 68 fixed to a shaft 32a of a paper feed roller 32 and to a pulley 69 fixed to a shaft 33a of a separation roller 33. The paper feed roller 32 and the separation roller 33 are thereby rotated respectively. A gear 71 is mounted integrally coaxially on the pulley 69. This gear 71 meshes with a gear 72 so provided as to be integral and coaxial with a transfer pulley 73. This gear 72 is rotatably loosely fitted to a shaft 74. Then, rotations of the pulley 69 and the gear 71 are transferred to a manual feed belt roller pulley 75 fixed to a shaft 38a of a belt driving roller 38 via the gear 72, the transfer pulley 73 and the belt 76. Further, a conveying belt 39, etc. is operated by the belt driving roller 38, whereby the subject is conveyed at a speed v.

Additionally, the pulley 68 is so provided as to be coaxial and integral with a transfer pulley 77. Rotations of the pulley 68 and the transfer pulley 77 are transferred via a belt 78 to a pulley 79 fixed to a shaft 34a of the conveying roller 34 and therefore transferred further to the conveying roller 34.

Note that a unidirectional clutch is provided between the driving roller 38 and the shaft 38a.

Normally, the main motor 61 and the paper feed driving motor 66 rotate so that the conveying belt 39 and the belts 44, 53 move at the same speed v. On the verge of manual feed photographing after the subject has been placed on the manual feed detection sensor 60, however, as illustrated in a block diagram of FIG. 3, a signal is transmitted from the manual feed detection sensor 60 to a control circuit 80. A control signal is transmitted therefrom to the driving motor 66. The number of revolutions of the motor 66 decreases corresponding to a preset paper feed speed (lower than the paper feed speed during the automatic paper feed). The belt 39 is thereby moved at a speed v' (<v). When the subject S2 is conveyed at the speed v by the conveying belt 44, the conveying belt 39 moving at the speed v' follows up the movement of the subject S2 owing to function of the unidirectional clutch described above, with the result that the belt 39 moves at the speed v. The subject is thus prevented from being damaged.

Figure 4:
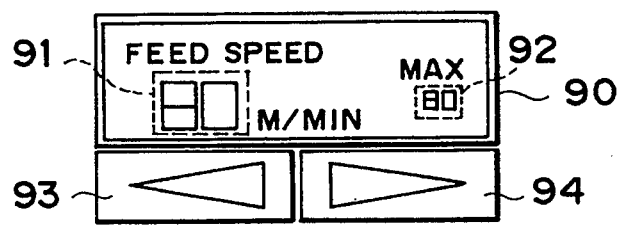
FIG. 4 is a block diagram illustrating a display section of the image recording device in the second embodiment of the present invention.
Figure 5:
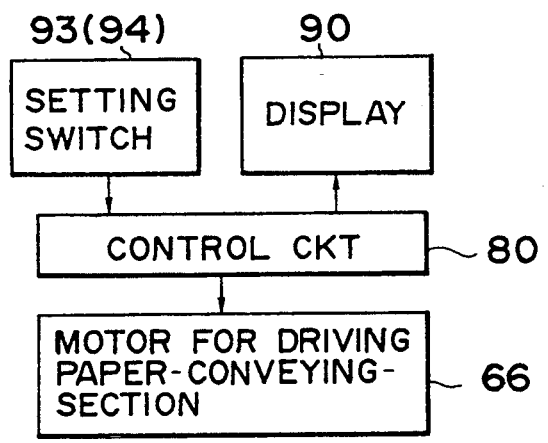
FIG. 5 is a block diagram showing how the operation thereof is controlled.

FIGS. 4 and 5 demonstrate the second embodiment of the present invention. For simplicity of explanation, a description will be given, wherein the same components as those in the first embodiment discussed above are marked with the like symbols.

The first embodiment discussed above has presented the 2-step changeover of the automatic paper feed and the manual paper feed. There is no such degree of freedom that the ordinary document is conveyed while reducing the paper feed speed in the automatic paper feed. Hence, in accordance with this embodiment, as shown in FIG. 4, a display 90 is provided with a feed speed display part 91 and a maximum speed display part 92 of the photographing device. Provided thereunder are a deceleration switch 93 and an acceleration switch 94 as manually manipulated speed setting switches capable of manually increasing and decreasing the paper feed speed by predetermined quantities. Other mechanical constructions are the same as those in the first embodiment described above. The paper feed speed can be increased and decreased every time switches 93, 94 are depressed.

FIG. 5 is a block diagram for the control thereof. When a signal is transmitted from the setting switch 93 or 94 to a control circuit 80, an indication on the feed display part 91 of the display is changed. The paper feed section driving motor 66 is controlled on one hand and rotated so that the paper feed section reaches the conveying speed displayed thereon.

With this operation, the user is able to freely set the paper feed speed in accordance the subject.

Figure 6:
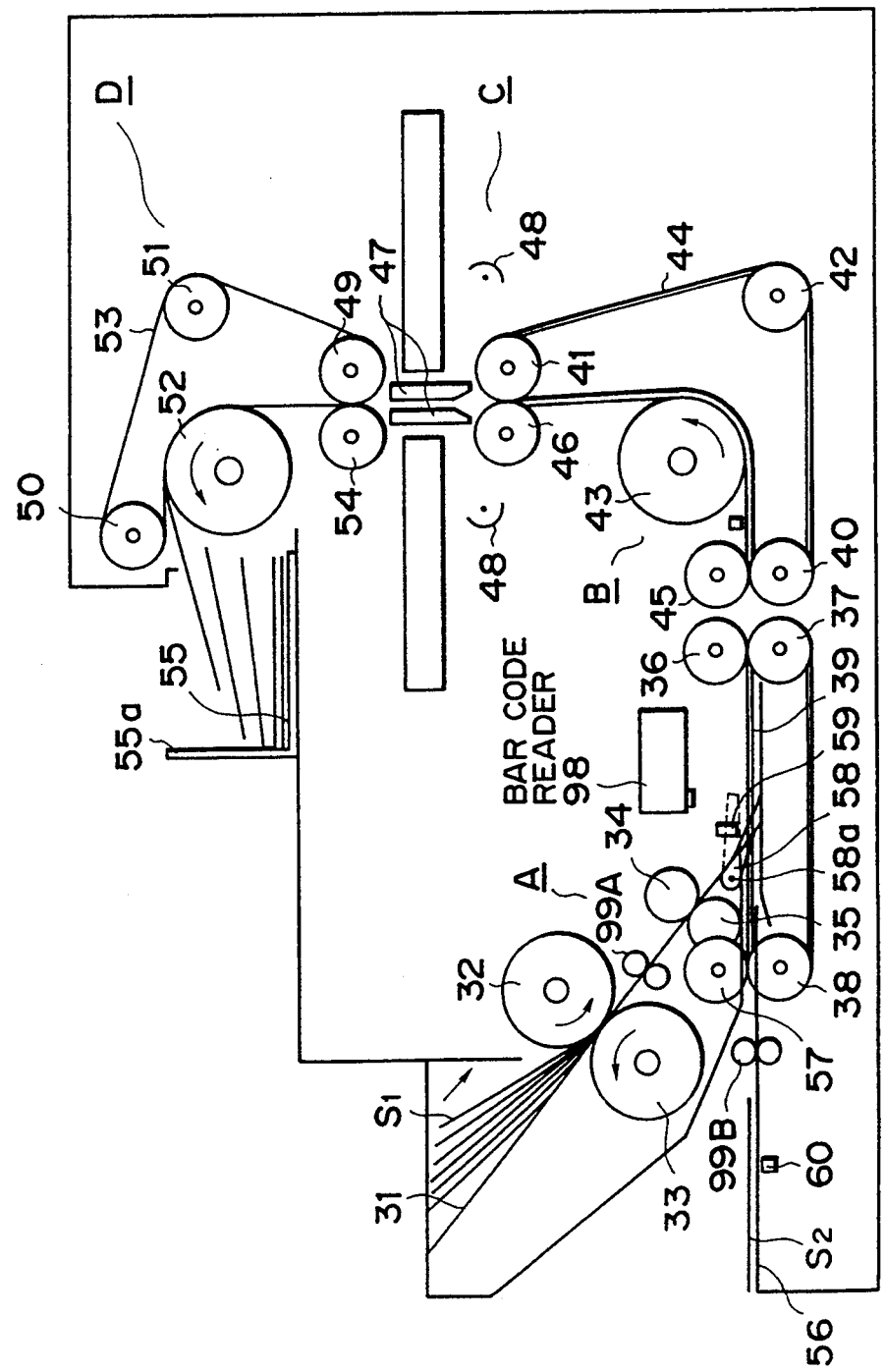
FIG. 6 is a diagram depicting the image recording device in the third embodiment of the present invention.
Figure 7:
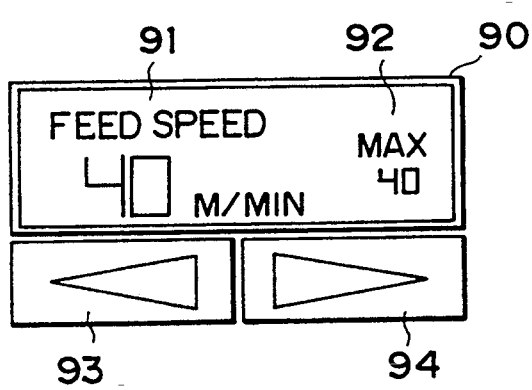
FIG. 7 is a block diagram showing a display section thereof.
Figure 8:
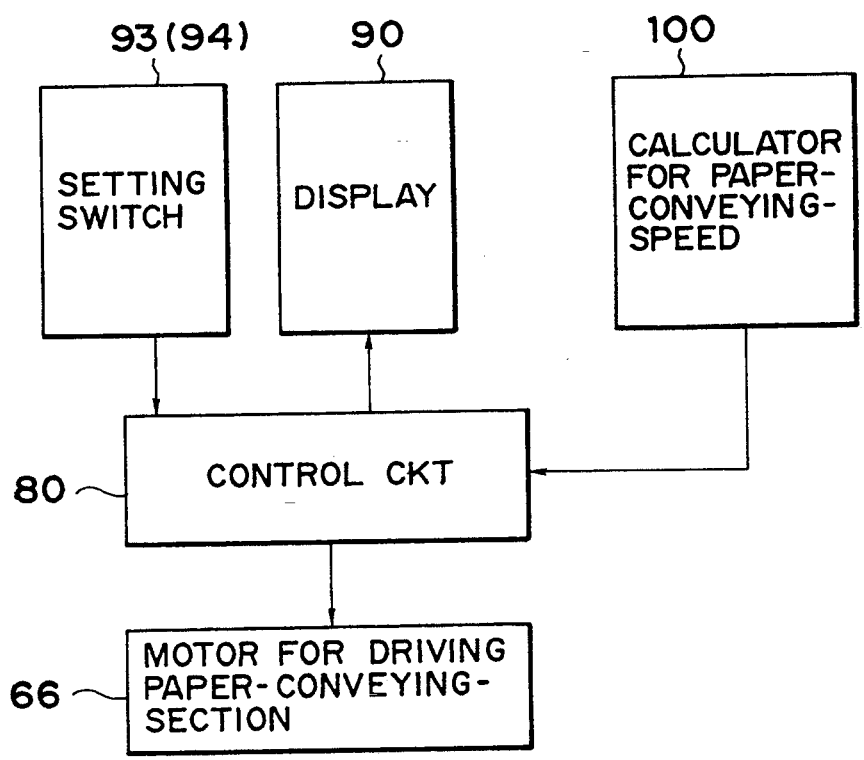
FIG. 8 is a block diagram showing how the operation thereof is controlled.

The third embodiment of the present invention will be demonstrated by FIGS. 6 to 8.

Give in this embodiment in an example where an automatic input unit such as a bar code reader or the like and a thickness detecting unit for detecting a thickness of the original are mounted. Referring to block diagram of FIG. 6 illustrating a subject conveying system, the numeral 98 designates a bar code reader, and the symbols 99A, 99B represent thickness detecting units. Other constructions are the same as those in FIG. 1 in the first embodiment.

Further, the configuration of the display of FIG. 7 is the same as that shown in FIG. 4 in the second embodiment discussed above.

FIG. 8 is a block diagram for the control thereof. A conveying speed arithmetic unit 100 calculates a conveying speed of the subject S at the bar code reader 98 in accordance with a read scan velocity and a bar code length of the bar code reader 98. The calculated conveying speed is inputted to a memory of the control circuit 80. When e.g., 40 m/min is inputted, as illustrated in FIG. 7, 40 is displayed in the maximum speed display part 92. This becomes the maximum speed of the device when the bar code reader is mounted. If read malfunctions are frequently caused in a printing state or the like of the bar code after conveying the subject, it is possible to make such an adjustment as to reduce the conveying speed by depressing the setting switch 93.

The thickness detecting units 99A, 99B include a pair of rollable roller disposed in the upper automatic paper feed path and in the lower manual paper feed path. When the sheet-like original is fed in between the pair of rollers, the upper roller moves upwards corresponding to a thickness of the original. The thickness of the original is detected by measuring the upward moving quantity of the upper roller.

Detected in this embodiment is whether or not the original has a thickness smaller than a predetermined thickness. When detecting the fact of being smaller than the predetermined thickness, the conveying speed of the paper feed section is reduced. As discussed above, there are eliminated the necessities for adjusting the exposure quantity in the illumination section and adjusting the stacker position in the ejecting section. Then, paper feeding states suitable for the subjects are selectable by changing over the conveying speed of the paper feed section, depending on the case where mass processing is to be quickly performed during the feed of paper and the case where recording is to be deliberately executed.

Provided further are a display for displaying a conveying speed of the paper feed section and a setting switch capable of arbitrarily setting a conveying speed. The conveying speed is thereby recognizable and settable as well. A degree of freedom of setting the conveying speed increases all the more. The paper feed state can be made optimal to the subject. Besides, even in the case of mounting the automatic input unit such as the bar code reader, etc., it can be set at a read optimum conveying speed.

Figure 9:
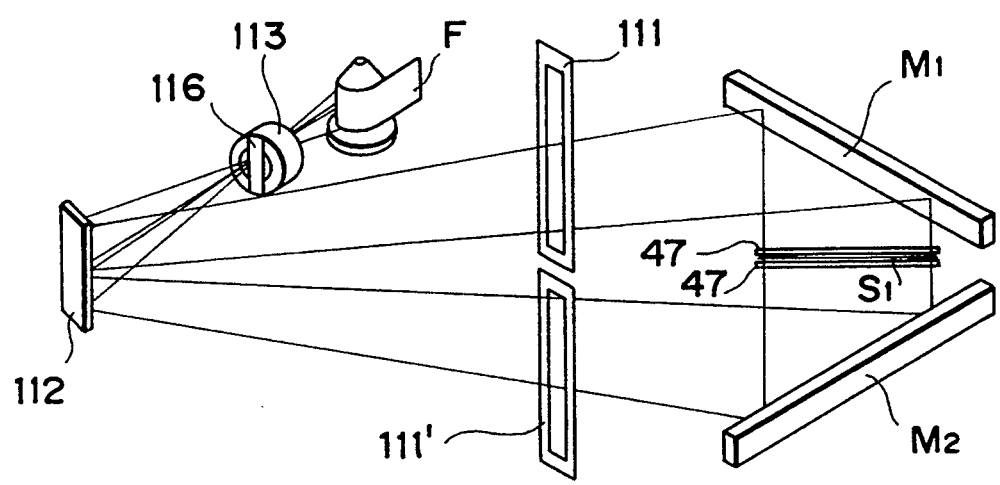
FIG. 9 is a perspective view illustrating a photographing optical system.

FIG. 9 illustrates an optical system for photographing images of the two surfaces of the original on a film. The images of the two surfaces of the original $S_1$ are illuminated with beams of the illumination lamps 48. The images are then projection-exposed onto a film F through an image forming lens 113 after being reflected by a mirror 112 via mirrors $M_1$, $M_2$ each disposed at 45° to the original and slits 111, 111'. Designated by 116 is a shutter for opening and closing a photographing light path.

Figure 10:
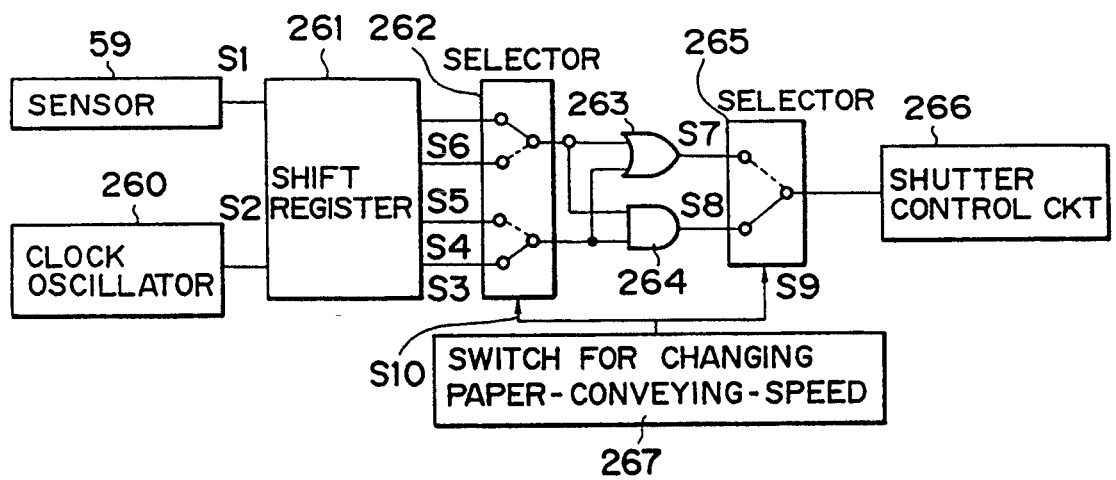
FIG. 10 is a block diagram illustrating a shutter opening/closing control circuit.
Figure 11:
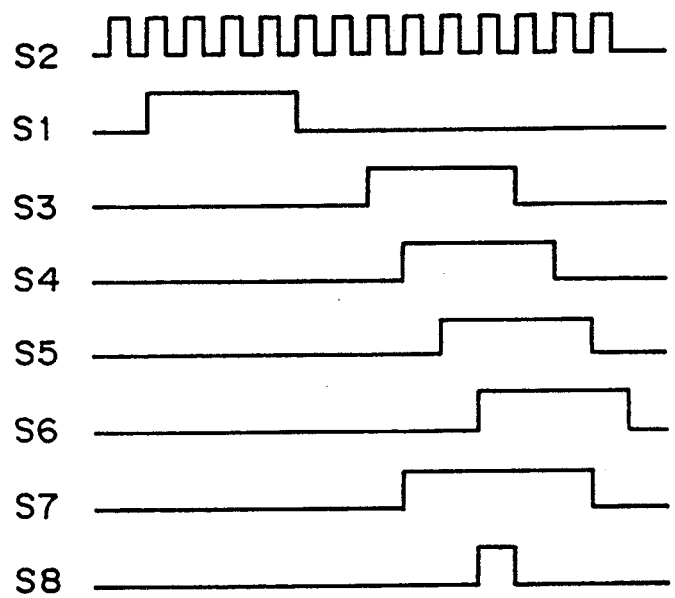
FIG. 11 is a timing chart showing output signals thereof.
Figure 12:
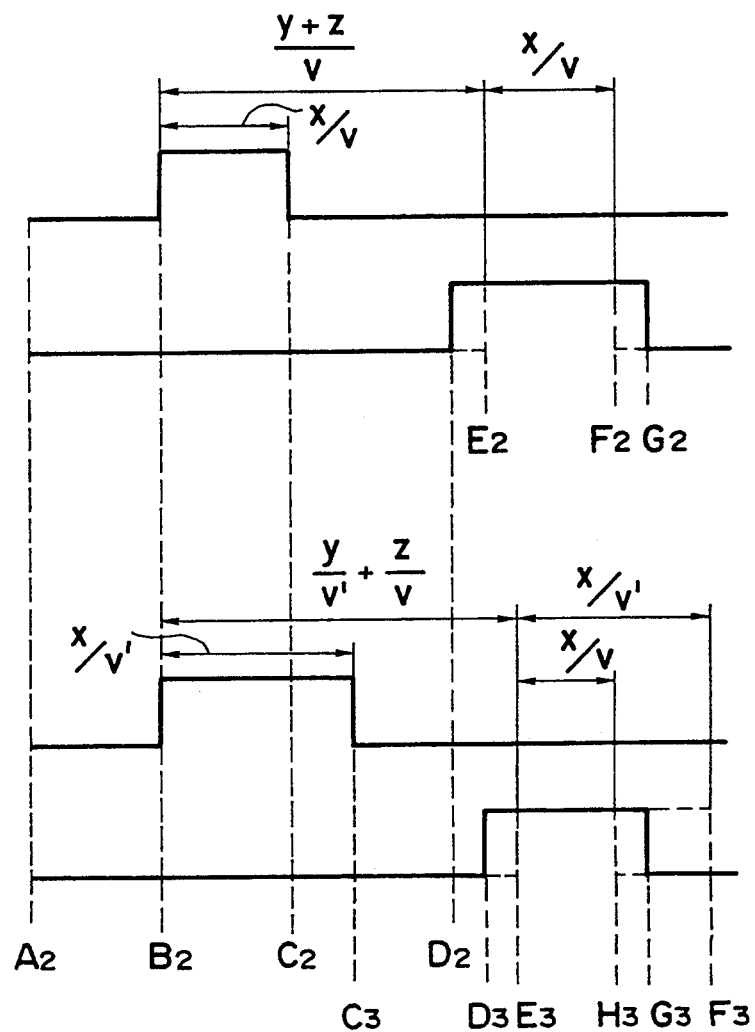
FIG. 12 is a timing chart showing the operation thereof.

Next, relations between signals from the subject detection sensor 59 and opening/closing timings of the shutter 116 will be explained with reference to FIGS. 10 to 12. FIG. 10 is a block diagram illustrating a shutter opening/closing control circuit. FIG. 11 is a timing chart of the output signals. FIG. 12 is a timing chart showing the operations. Referring to FIG. 1, let x be the length of the subject, let y be the distance from a detection position of the sensor 59 to the conveying speed constant-side inlet roller 45, and let z be the distance from the roller 45 to the photographing center. In FIG. 12, a point $A_2$ indicates a time when turning on the power supply; the top end of the subject is detected by the sensor 59 at a point $B_2$; and the rear end thereof is detected at a point $C_2$. The shutter opens (point $E_2$) with a delay of time calculated by using the conveying speed v and the distance y+z from the sensor to the photographing center—i.e., the time being given by (y+z)/v—after detecting the top end of the subject at the point $B_2$.

To begin with, a relation between the sensor 59 and the shutter will be explained in conjunction with FIG. 12. In the case of the automatic paper feed, the speeds v in the paper feed section and other conveying sections are equal, and hence the sensor 59 detects the top end of the fed subject at the point $B_2$ and detects the rear end of the subject at the point $C_2$. On receiving detection signals thereof, a circuit which will be mentioned later adds allowance times $D_2E_2$, $F_2G_2$ to a passing time $B_2C_2$ of the subject which has passed under the sensor 59. The shutter 116 opens at a point $D_2$ and closes at a point $G_2$. On the other hand, in the case of the manual paper feed, the conveying speed in the conveying section other than the paper feed section is constant. However, the conveying speed in the paper feed section is decreased down To v'. Hence, after the subject has passed under the sensor 59, a time $B_2E_3$ until the photographing center is reached is later than $B_2E_2$ in the automatic paper feed. Further, a time $E_3H_3$ for which the subject passes through the photographing center is shorter by a conveying speed shown in the FIGURE than a time $B_2C_3$ for which the subject passes under the sensor 59. Allowances times $D_3E_3$, $H_3G_3$ are added to this $E_3H_3$. The shutter opens at $D_3$ and closes at $G_3$.

A circuit for opening and closing the shutter corresponding to these two states will be described with reference to FIGS. 10 and 11.

Indicated by S1 in FIG. 10 is a signal inputted from the sensor 59 to a shift register 261. The symbol S2 represents a clock signal from a clock 260. The symbols S3–S6 represent preset output signals from a shift register 261.

The shift register 261 is intended to transmit a subject detection signal from the sensor 59 to a shutter control circuit 266 with a delay. A clock signal invariably having a constant pulse is inputted from a clock oscillator 260 to the shift register 261. The shift register 261 outputs the signals from the sensor with a predetermined time lag (several pulses).

A selector 262 is connected to an output-side of the shift register 261. An input terminal of a selector 265 is connected to an output terminal of the selector 262 via an OR circuit 263 and an AND circuit 264. An output terminal thereof is connected to the shutter control circuit 266. The terminals of the selectors 262, 265 are selected beforehand by signals S9, S10 from a conveying speed changeover switch 267.

In accordance with this embodiment having the construction discussed above, the selectors 262, 265 are at first connected to the terminals shown by broken lines in the case of the automatic paper feed. Signals S4, S5 are selected as output signals from the shift register 261. In the selector 265, an OR signal S7 of the OR circuit 263 is selected as an output signal and transmitted to the shutter control circuit 266. It is thus possible to open and close the shutter with an allowance time given to the time for which the subject passes under the sensor 59.

On the other hand, in the case of the manual paper feed, the selectors 262, 265 are connected to the terminals drawn by solid lines. Signals S3, S6 are selected as output signals from the shift register 261. In the selector 265, an AND signal S8 of the AND circuit 264 is selected as an output signal and transmitted to the shutter control circuit 266. It is thus feasible to open the shutter with a time lag longer than in the automatic paper feed and close the shutter in a shorter time than the time for which the subject passes under the sensor 59.

Note that the signals S3–S6 are arbitrarily set in accordance with the paper feed speed in the automatic or manual paper feed.

FIG. 13 shows the second embodiment of the shutter opening/closing control circuit.

The first embodiment described above presents the two-step speed changeover. This embodiment is arranged to correspond to stepless speed variations.

When inputting conveying speed data 380 to a control circuit 379, pulse widths of clock oscillators 381, 382 are set by output signals S13, S24. Selectors 373, 374 each selects one of output signals S16, S17 of shift registers 371, 372 by use of output signals S14, S25. A selector 377 selects an OR circuit 375 or an AND circuit 376 by use of an output signal S15. Signals S11 are transmitted from the sensor 59 to the shift registers 371, 372. Pulse signals are further inputted from the clock oscillators 371, 372 to the shift registers 371, 372. The selectors 373, 374 each selects one signal among signal groups S16, S17 of the shift registers 371, 372. The selected signals are inputted as signals S18, S19 to the OR circuit 375 and the AND circuit 376. A selector 377 selects an output signal S20 transmitted from the OR circuit or a signal S21 transmitted from the AND circuit 376. The selected signal is inputted to the shutter control circuit 378, thereby opening and closing the shutter.

Then, an opening/closing time of the shutter is adjusted by changing pulse widths of the clock oscillators 381, 382. The selectors 373, 374 select outputs of the shift registers 371, 372, thereby making it possible to adjust a delay of the shutter opening/closing time after the subject has passed under the sensor 59.

Figure 15:
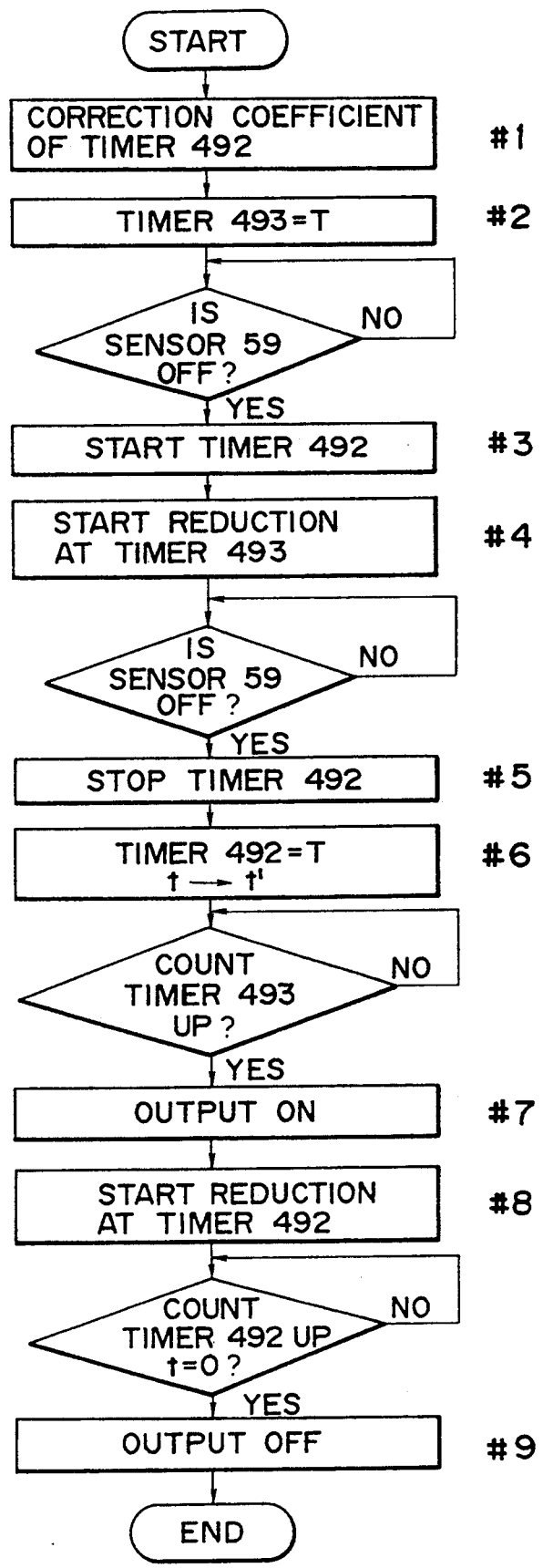
FIG. 15 is a flowchart of assistance in explaining the operation thereof.
Figure 16:
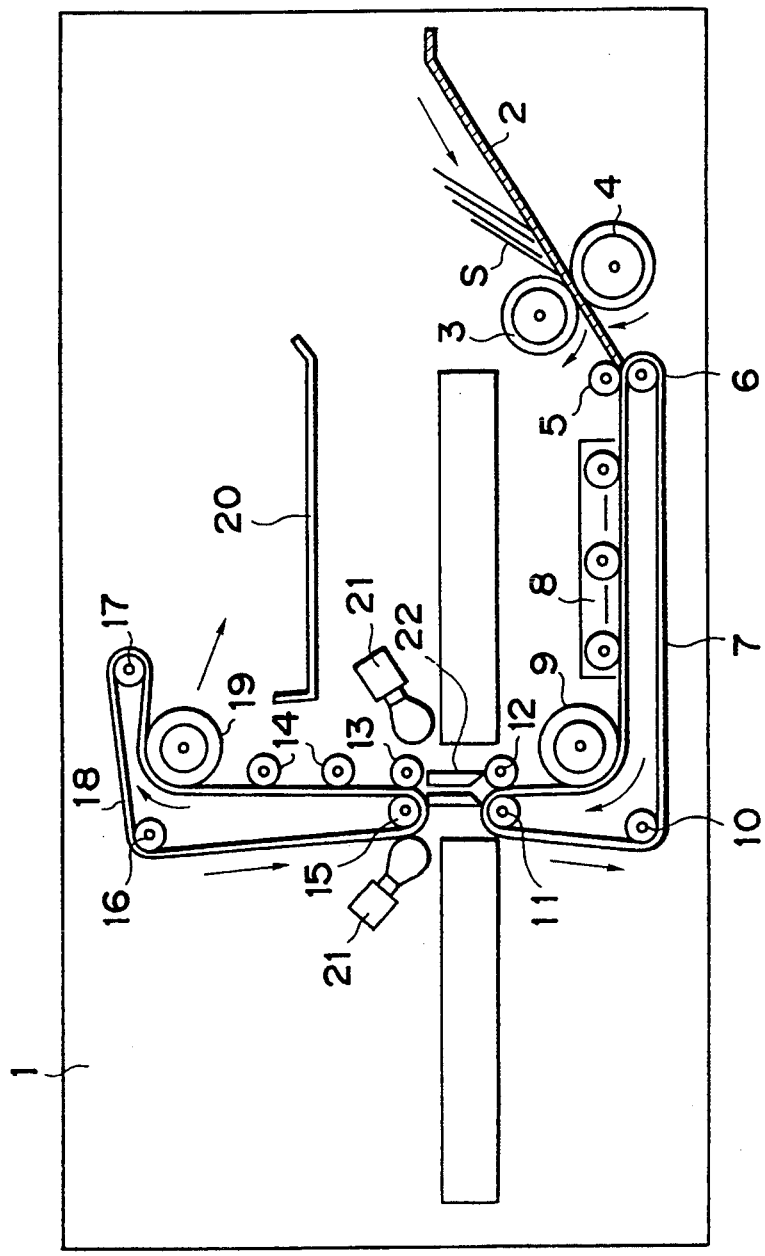
FIG. 16 is a schematic block diagram illustrating a conventional image recording device.

FIGS. 14 and 15 show the third embodiment.

In this embodiment, the operation is performed without using the shift registers. An explanation will be given with reference to a block diagram of FIG. 14 and a flowchart of FIG. 15.

A signal S31 is inputted from the sensor 59 to a CPU 491 incorporating timers 492, 493. An output signal S32 thereof is inputted to a shutter control circuit 494. The timer 492 counts up a time for which the subject passes under the sensor 59. The timer 493 counts up a time until the photographing center is reached after the subject has passed under the sensor 59.

To start with, a carry-in speed of the subject is inputted in #1. Based on this numerical value, a constant for calculating a shutter opening time t' is computed from a time t required for the passage. Further, a time T of the timer 493 is determined in #2.

Next, when the subject begins to pass under the sensor 59, the timer 492 is actuated and starts counting up the subject passing time in #3 after the signal S31 has been inputted from the sensor 59 to the CPU 491. Simultaneously, the timer 493 starts subtracting the preset time in #4. When transmitting, to the CPU 491, a signal indicating that the subject has completely passed under the sensor 59, the timer 492 stops in #5. The shutter opening time t' is calculated from the time required for the passage in #6. After passing under the sensor 59, and when a timer 493's time T=0, an output signal S32 is transmitted to the shutter control circuit 494 in #7, thereby opening the shutter. Simultaneously, the timer 492 starts subtracting the time t required for the passage of the subject under the sensor 59 in #8. When the calculated shutter opening time t'=0, the output signal S32 is transmitted to the shutter control circuit 494 in #9, thereby closing the shutter.

In this manner, the control can be effected by deducing the shutter opening time and the shutter opening/closing timings from the conveying speed of the subject.

As discussed above, the shutter opening/closing timings can be varied corresponding to the conveying speeds with the passage of the subject in the paper feed section which is detected by the subject detection sensor provided in the paper feed section. The spacing between the images on the film is not influenced by variations in the conveying speed and can be made constant. A waste of the film can be eliminated.

Although the illustrative embodiments of the present invention have been described in detail with reference to the accompanying drawings, it is to be understood that the present invention is not limited to those embodiments. Various changes or modification may be effected by one skilled in the art without departing from the scope or spirit of the invention.

What is claimed is:

1. An image recording device comprising:
   first conveying means for conveying an original from a paper feed position to a predetermined position located before a recording position, the original being one of a plurality of types;
   second conveying means for conveying the original conveyed to said predetermined position by said first conveying means, to a receiving position through said recording position, said second conveying means conveying the original at a constant speed;
   recording means for reading an image on the original which is moving at said constant speed through said recording position and recording it onto a recording medium; and
   control means for changing an original conveying speed conveyed by said first conveying means, wherein the original conveying speed of said first conveying means changes based on the original type.

2. The device as defined in claim 1, wherein said original is placeable in different paper feed positions, and said original placed in the respective paper feed positions is conveyed by said first conveying means at different speeds.

3. The device as defined in claim 1, further comprising a manipulation member for manually setting the conveying speed of said first conveying means.

4. The device as defined in claim 3, further comprising a means for displaying a conveying speed set by said manipulation means.

5. The device as defined in claim 1, wherein the original conveying speed by said first conveying means is adjusted to be equal to or lower than an original conveying speed conveyed by said second conveying means.

6. The device as defined in claim 1, further comprising a shutter member for opening and closing a projection light path of the image and a shutter control means for controlling the opening/closing operations of said shutter member, said shutter control means adjusting the opening/closing timings of said shutter member in accordance with the conveying speed of said first conveying means.

7. The device as defined in claim 6, further comprising a detection means for detecting that said original has been conveyed to a predetermined position, said shutter member being so controlled as to be opened and closed by outputs of said detection means.

8. The device as defined in claim 1, wherein the conveying speed of said first conveying means is changed depending on a thickness of said original.

9. A recording device for projecting images of an original on a recording medium, the original being one of a plurality of types, said recording device comprising:
   optical means for projecting an image of the original which is moving through an illumination position, to the recording medium which is moving;
   first conveying means for conveying the original placed at a feed section to a predetermined position located before said illumination position at a first conveying speed;
   second conveying means for conveying the original conveyed to said predetermined position by said first conveying means, to a receiving position through said illumination position at a second conveying speed which is constant; and
   setting means for setting a conveying speed of said first conveying means to change the first conveying speed of said first conveying means, wherein the conveying speed of the first conveying means changes based on the original type.

10. The device defined in claim 9, wherein the conveying speed is changed depending on a thickness of said original.

11. The device defined in claim 9, wherein the conveying speed of said first conveying means is manually arbitrarily settable.

* * * * *

UNITED STATES PATENT AND TRADEMARK OFFICE
CERTIFICATE OF CORRECTION

PATENT NO. : 5,365,323
DATED : November 15, 1994
INVENTOR(S) : KYOICHI ANDO

It is certified that error appears in the above-indentified patent and that said Letters Patent is hereby corrected as shown below:

<u>Column 3,</u>
    line 25, "anticlockwise" should read
            --counterclockwise--.
    line 26, "anticlockwise" should read
            --counterclockwise--.
<u>Column 5,</u>
    line 42, "Give" should read --Given--; and "in an"
            should read --is an--.
<u>Column 6,</u>
    line 2, "roller" should read --rollers--.
<u>Column 7,</u>
    line 10, "To" should read --to--.
<u>Column 9,</u>
    line 10, "modification" should read
            --modifications--.
<u>Column 10,</u>
    line 41, "speed is" should read --speed of said first
            conveying means is--.

Signed and Sealed this

Twenty-fifth Day of April, 1995

Attest:

BRUCE LEHMAN

*Attesting Officer*        *Commissioner of Patents and Trademarks*